Patented Feb. 7, 1928.

1,658,605

UNITED STATES PATENT OFFICE.

GUSTAV J. LIEBICH, OF CHICAGO, ILLINOIS, ASSIGNOR TO G. J. LIEBICH COMPANY, OF CHICAGO, ILLINOIS, A CORPORATION OF ILLINOIS.

PLASTIC COMPOSITION.

No Drawing.    Application filed December 8, 1926.  Serial No. 153,475.

My invention relates to a composition of matter and particularly to an improvement in the composition disclosed in the patent to Crandall, No. 949,061, of Feb. 16, 1910.

In the said Crandall patent, a composition is disclosed adapted for use in filling cracks and crevices and for surfacing of wood, which composition has been useful to a certain degree, but has some disadvantages. The most important drawback is that of the difficulty experienced when the material is produced on a large scale, due to its tendency to deteriorate. A further difficulty is one encountered in use, that of susceptibility to moisture, it not being waterproof.

As the result of numerous experiments, I have produced a composition of matter that, while having a base of plaster of Paris, is different in composition and functions and possesses many valuable properties not possessed by similar compositions heretofore proposed. One novel characteristic is that the time of setting can be regulated according to the size of the batch; second, it is much more waterproof than ordinary mixtures of this character; third, it is much less subject to climatic conditions, and fourth, in general, it is a more desirable and adaptable material.

As stated, I use gypsum or plaster of Paris as the basis of the composition, and, as well-known, this material has a tendency to set very promptly after its association with water. For this reason, I have introduced in the composition a quantity of borax which serves the double purpose of retarding the time of setting of the gypsum and preventing the formation of mold on the surface, an objection frequently made to the composition of the Crandall patent. Incidentally, I have found that the use of oil of sassafras and glycerine is useless in that compound. Common salt on the other hand, tends to accelerate the setting of the gypsum, and while it is not my intention to accelerate the time of setting, I use a certain amount of salt to off-set the retarding effect of certain other chemicals that are used in the composition. One of such retarding chemicals has already been mentioned; others that I use are mucilaginous materials such as glue, casein or dextrin, which are added in order to increase the binding characteristics of the product.

In order to effect water-proofing action, I have deemed it advisable to introduce rosin which, after the drying of the material acts in the desired manner. Instead of using plain rosin, I have found it more advantageous to use a reaction product of rosin and borax. When these chemicals are treated together, a combination is formed that consists of the sodium salt of abeitic acid and boric acid and the intermediate products of the reaction. This compound has great waterproofing power. I have also found that a small amount of a drying oil has also a very desirable effect in making the product waterproof.

I have found it advisable in many instances to employ a quantity of a filler, preferably inert in the compound. The compound can be colored as desired, by the addition of suitable pigments in the proper portions.

In order to provide specific examples, I add hereto a number of formulas representing products that yield very satisfactory results. In each case, while I have indicated definite proportions, it will be understood that such proportions, may be varied within certain limits.

1. 49.75 parts of plaster of Paris, 8.00 parts of white dextrin, 2.25 parts of white talc, 37.90 parts of water, 1.2 parts of salt, 0.8 parts of borax, 0.1 parts of sassafras oil.

2. 49.75 parts of plaster of Paris, 8.00 parts of dextrin, 2.25 parts of burnt sienna, 37.90 parts of water, 1.20 parts of salt, 0.8 parts of borax, 0.1 parts of sassafras oil.

3. 49.75 parts of plaster of Paris, 8.00 parts of dextrin, 2.00 parts of talc, 0.25 parts of steco paste, 37.82 parts of water, 1.20 parts of salt, 0.80 parts of borax, 0.10 parts of sassafras oil, 0.08 parts of chinawood oil.

4. 49.75 parts of plaster of Paris, 8.00 parts of dextrin, 2.00 parts of burnt umber, 0.25 parts of steco paste, 37.82 parts of water, 1.20 parts of salt, 0.80 parts of borax, 0.10 parts of sassafras oil, 0.08 parts of chinawood oil.

5. 49.75 parts of plaster of Paris, 8.00 parts of dextrin, 2.25 parts of talc, 36.10 parts of water, 1.20 parts of salt, 0.80 parts of borax, 1.80 parts of rosin, 0.10 parts of sassafras oil.

In this composition the rosin is dissolved in 10.8 parts by weight in a mixture which is constituted of 2/3 alcohol and 1/3 benzol. The solvent evaporates off during the mixing of the product.

6. 40.75 parts of plaster of Paris, 8.00 parts of dextrin, 2.25 parts of talc, 9.00 parts of burnt sienna, 36.10 parts of water, 1.20 parts of salt, 0.80 parts of borax, 1.80 parts of rosin, 0.10 parts of sassafras oil.

7. 46.75 parts of plaster of Paris, 8.00 parts of white dextrin, 5.00 parts of white talc, 36.47 parts of water, 1.2 parts of salt, 0.80 parts of borax, 0.10 parts of sassafras oil, 0.08 parts of chinawood oil, 1.60 parts of rosin.

8. 49.75 parts of plaster of Paris, 8.00 parts of white dextrin, 2.25 parts of white talc, 35.40 parts of water, 1.20 parts of salt, 0.80 parts of borax, 0.10 parts of sassafras oil, 2.50 parts of casein.

As heretofore stated, the proportions mentioned are those that have been found to produce a satisfactory product. However, the proportions may be varied somewhat without departure from the spirit of my invention, and I do not wish to be limited except as indicated in the appended claims.

I claim:

1. A composition of matter for filling cracks and crevices, and making smooth the surfaces of rough wood, consisting of gypsum as a base, borax as a retarder, salt as an accelerator, dextrin as a binder, talc as a filler, rosin, and a drying oil as a waterproofing agent.

2. A composition of matter consisting of gypsum as a base, borax as a retarder, salt as an accelerator, dextrin as a binder, talc as a filler, a pigment to produce a desired shade, rosin, a drying oil, casein as a waterproofing agent, to be used for filling cracks and crevices, and making smooth the rough surfaces of wood.

3. A composition of matter, gypsum, borax, dextrin, talc, burnt sienna, salt, rosin, chinawood oil and water, to be used for filling cracks and crevices, and for making smooth the rough surfaces of wood.

In testimony whereof I have affixed my signature.

GUSTAV J. LIEBICH.